(12) United States Patent
Yung et al.

(10) Patent No.: US 9,609,073 B2
(45) Date of Patent: Mar. 28, 2017

(54) AGGREGATING SOCIAL NETWORKING SYSTEM USER INFORMATION FOR DISPLAY VIA STORIES

(71) Applicant: Facebook, Inc., Menlo Park, CA (US)

(72) Inventors: Raylene Kay Yung, San Francisco, CA (US); Daniel Schafer, San Francisco, CA (US); Li Zhang, Mountain View, CA (US); Serkan Piantino, New York, NY (US); Maxim Gubin, Walnut Creek, CA (US)

(73) Assignee: Facebook, Inc., Menlo Park, CA (US)

( * ) Notice: Subject to any disclaimer, the term of this patent is extended or adjusted under 35 U.S.C. 154(b) by 753 days.

(21) Appl. No.: 13/928,744

(22) Filed: Jun. 27, 2013

(65) Prior Publication Data
US 2013/0290430 A1 Oct. 31, 2013

Related U.S. Application Data

(62) Division of application No. 13/239,354, filed on Sep. 21, 2011, now Pat. No. 8,869,017.

(51) Int. Cl.
*G06F 17/00* (2006.01)
*H04L 29/08* (2006.01)
*G06F 17/21* (2006.01)
*G06Q 50/00* (2012.01)

(52) U.S. Cl.
CPC ............ *H04L 67/22* (2013.01); *G06F 17/211* (2013.01); *G06Q 50/01* (2013.01)

(58) Field of Classification Search
CPC ....... G06F 17/211; G06F 17/24; G06F 17/241

USPC ......................................... 715/200, 201, 203
See application file for complete search history.

(56) References Cited

U.S. PATENT DOCUMENTS

| | | | |
|---|---|---|---|
| 7,162,197 B2 * | 1/2007 | Kitamura | A63H 33/38 434/317 |
| 8,332,741 B2 * | 12/2012 | Evans | G09B 5/04 434/178 |
| 8,433,993 B2 * | 4/2013 | Weinberger | G06F 17/30053 715/202 |
| 8,775,161 B1 * | 7/2014 | Nichols | G06F 17/30699 704/1 |
| 8,886,520 B1 * | 11/2014 | Nichols | G06F 17/30719 704/1 |
| 8,892,417 B1 * | 11/2014 | Nichols | G06N 5/02 704/1 |
| 2010/0146398 A1 * | 6/2010 | Evans | G09B 5/04 715/744 |
| 2010/0332958 A1 * | 12/2010 | Weinberger | G06F 17/30053 715/201 |

(Continued)

*Primary Examiner* — Stephen Hong
*Assistant Examiner* — Gregory J Vaughn
(74) *Attorney, Agent, or Firm* — Fenwick & West LLP (57) ABSTRACT

To generate stories for presentation to social networking system users, one or more story generation engines receives a set of actions of social networking system users. Various story generation engines output stories of different types that collect particular types of actions and arrange the actions in a specified format for presentation. The story generators may avoid selecting the same actions for different stories. Stories generated by the various story generators may be ranked and the ranking used to select stories for presentation to one or more social networking system users.

17 Claims, 4 Drawing Sheets

(56) References Cited

U.S. PATENT DOCUMENTS

2012/0054190 A1* 3/2012 Peters .............. G06F 17/30056
707/741

* cited by examiner

AGGREGATING SOCIAL NETWORKING SYSTEM USER INFORMATION FOR DISPLAY VIA STORIES

CROSS-REFERENCE TO RELATED APPLICATIONS

This application is a continuation-in-part of U.S. patent application Ser. No. 13/239,354, filed on Sep. 21, 2011, which is incorporated by reference in its entirety.

BACKGROUND

This invention relates generally to social networking and, in particular, to displaying information about users of a social networking system.

Social networking systems capture large volumes of information from various sources. Information stored by the social networking system will often, if not always, have a time associated with it. Typically, information about a user of a social networking system is displayed through a profile web page that is divided into sections, each section containing different types of information pertaining to the user. For example, a user's profile page may have separate sections for educational information, interests, status updates, and hobbies, as well as a section containing thumbnails of photos of the user, and links to the user's friends.

The shortcoming of this sort of display is that as the social networking system accumulates more and more information about the user over time, it becomes difficult to locate older information about the user, since the user's profile page has a limited amount of display space, and the system is constantly obtaining new information as the user adds new photos, friends, status updates, etc. Although viewers of a user's profile page are often interested in the newest information about a user, this will not always be the case. For example, old classmates of a user may wish to browse information about the user from a shared time together at university that occurred many years earlier.

SUMMARY

Embodiments of the invention present stories describing of information related to a social networking system user in various interfaces, or "views." In an embodiment of the invention, the social networking system accesses information about a user, including both data about the user, such as date of birth, graduation date, interests, employers, photos, videos, etc., as well as social network activities related to the user, such as comments, status updates, blog posts, etc. The social networking system then selects one or more of these pieces of data and/or activities and gathers them into stories based on their relatedness and their relevance to users.

The stories are customized aggregations of information configured for presentation of information in a particular data view. For example, data and/or activities from a time period may be gathered into a story type called a story unit based on being of a similar type. The story unit is used to present information about the user via one or more interfaces. In another example, data and/or activities associated with a location may be gathered together into a story based on being associated with that location, and this story may be used to present information about the user on a map. The created stories are ranked based on their relevance to users, with the ranking used to select stories for presentation to a user via one or more interfaces, or "views," including visual representations of the selected stories.

Figure 1:
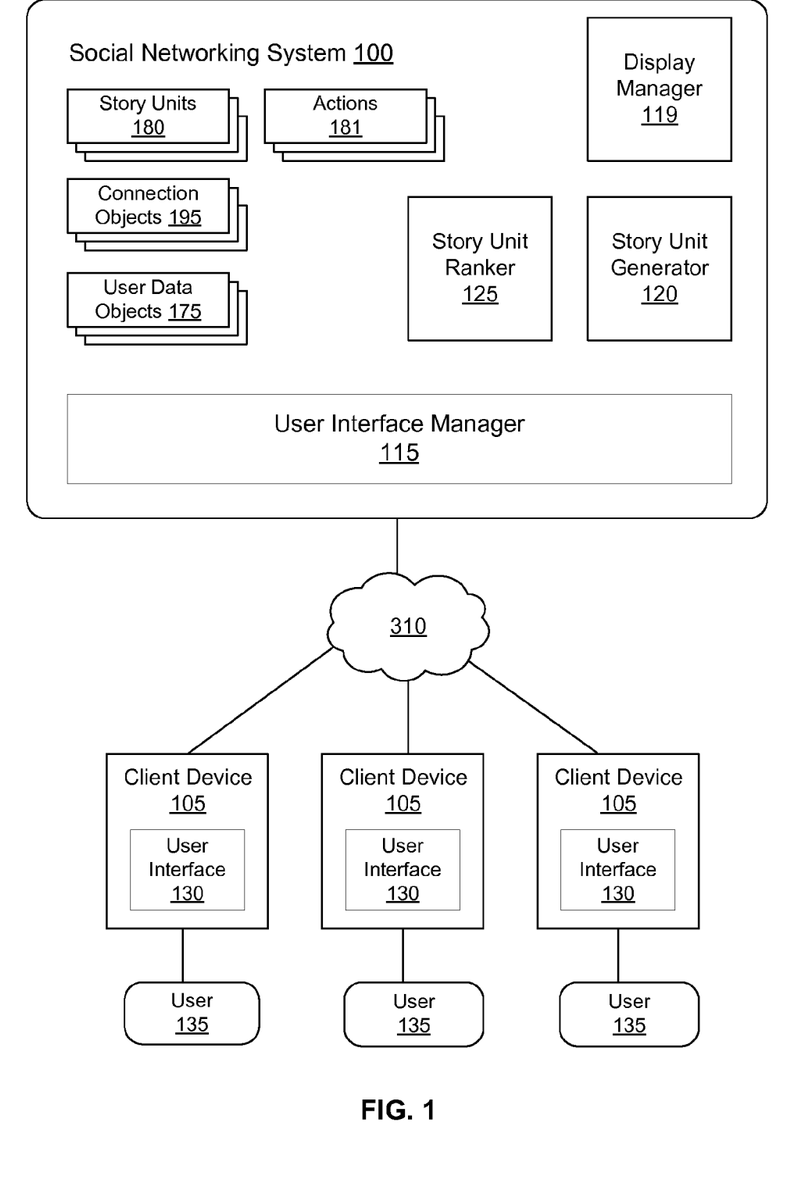
FIG. 1 is a diagram of a system environment for presenting story units to users of a social networking system, in accordance with an embodiment of the invention.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system generates story units based on data in the social networking system associated with users and generates displayable representations of selected story units. The displayable representations of selected story units are communicated to client device for presentation to viewing users. Selection of story units for presentation to viewing users may be based on a ranking of candidate story units, where a machine-learned model may perform the ranking.

System Overview

FIG. 1 is a diagram of a system environment for presenting story units pertaining to a social networking system user to other social networking system users, in accordance with an embodiment of the invention. The users 135 interact with the social networking system 100 using client devices 105. Some embodiments of the systems 100 and 105 have different and/or other modules than the ones described herein, and the functions can be distributed among the modules in a different manner than described here.

The social networking system 100 offers its users the ability to communicate and interact with other users of the social networking system 100. Users 135 join the social networking system 100 and then add connections to other users of the social networking system 100 to whom they wish to be connected. When a user joins the social networking system 100 they create a user account allowing the user to maintain a persistent and secure identity on the social networking system 100. The user account includes a user profile storing details about the user, such as name, age, sex, etc.

When the social networking system 100 performs an action with the user, this action may be conducted with the user account, and not literally with the user (the human being) controlling the user account. For example, when the social networking system 100 creates a connection between two users, the social networking system 100 creates a connection between the user accounts of the two users. User accounts may be created for individuals and for other entities such as corporations, non-profits, fictional characters, etc. A "user" of the social networking system 100 can be any such entity.

A client device 105 is any device having data processing and data communication capability. A user 135 interacts with the social networking system 100 using the client device 105. Examples of a client device 105 include a personal computer (PC), a desktop computer, a laptop computer, a notebook computer, or a tablet computer. These computers may execute an operating system, for example, a WINDOWS®-compatible operating system (OS), APPLE® OS X®, or any other suitable operating system. A client device 105 may also be any device having computer functionality, such as a personal digital assistant (PDA), a mobile telephone, a smartphone, etc.

The interactions between the client devices 105 and the social networking system 100 are typically performed via a network 310, which enables communications between client devices 105 and the social networking system 100. In one embodiment, the network 310 uses standard communications technologies and/or protocols. Thus, the network 310 may include communication channels using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 310 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. Data exchanged over the network 310 may be represented using technologies and/or formats including the hypertext markup language (HTML), the extensible markup language (XML), etc. In addition, all or some of the communication channels comprising the network 310 may be encrypted using conventional encryption technologies such as secure sockets layer (SSL), transport layer security (TLS), virtual private networks (VPNs), Internet Protocol security (IPsec), etc. In another embodiment, the client devices 105 and social networking system 100 may use custom and/or dedicated data communications technologies instead of, or in addition to, the ones described above. Depending upon the embodiment, the network 310 may also include connections to other networks such as the Internet.

A client device 105 executes a user interface 130 allowing the user 135 to perform various actions associated with the social networking system 100 and to view information provided by the social networking system 100. Examples of actions performed using the user interface 130 include adding connections, posting messages, posting links, uploading images or videos, updating the user's profile settings, and the like. Examples of information provided by the social networking system 100 for viewing via the user interface 130 include: images or videos posted by additional users connected to a user, comments posted by additional users connected to the user, messages sent to the user by other users, and wall posts. In an embodiment, the user interface 130 is presented to the user via a browser application allowing a user to retrieve and present information from the internet or from a private network. In another embodiment, the user interface 130 is a mobile application executing on a mobile device such as a smart phone or a tablet. In yet another embodiment, the user interface 130 consists of an application executed by a desktop or laptop computer.

The user interface 130 allows users to view data related to users that is stored by the social networking system 100. In various embodiments, stored data related to a user is presented to other users through a "profile page," which is an arrangement of data maintained by the social networking system 100 and associated with the user. For example, a profile page is data and instructions in a standard format presented through a browser. Examples of data or instructions for generating a profile page include extensible markup language (XML), hypertext markup language (HTML), cascading style sheets (CSS), JAVASCRIPT®, plaintext and JAVA®, sent from a server to a web browser running on a client. In another embodiment, a profile page comprises data formatted for presentation through a mobile app or desktop application. When a user "A" views the profile or data of another user "B," which may be an individual user or an entity, the user "A" is called the "viewing user," and the entity "B" is called the "subject user." The user interface 130 allows a viewing user to explore information about a subject user via a timeline interface generated by the display manager 119, further described herein. The timeline interface may present a viewing user with the information of a single subject entity, or it may present the viewing user with the data of several subject entities.

The social networking system 100 maintains different types of data, for example, data objects 175, connection objects 195, and objects representing story units 180 and actions 181. A data object 175 stores information related to an individual user or other entity of the social networking system 100. For example, a data object associated with a user stores a user's date of birth, stores a photo of the user, stores a reference to a photo of the user, or stores other information describing the user. A connection object 195 stores information describing the relationship between two objects stored in the social networking system 100. An action object 181 stores information related to actions performed by entities or individual users of the social networking system 100. Almost any activity of a user of the social networking system 100 may be stored as an action. For example, an action may be the posting of a new comment or status update or it may be forming a connection to a user.

The social networking system 100 maintains a social graph that tracks the relationship between the various objects, actions, connections, users, and entities stored by the social networking system 100. In the social graph, individual users, entities, and other objects are represented as nodes that have edges to other nodes. The edges represent actions or connections that create a relationship between the nodes. For example, a node representing a photograph stored in the social networking system 100 may have an edge to a user that uploaded the photograph, and this edge may be an "uploaded by" action. The same photograph may have edges to several other nodes that represent the users in that photograph, and these edges may be "tagged in" actions. Similarly, a node representing a user in the social networking system 100 may have edges to each node representing social networking system connections (friends) of that user. These edges may indicate the relationship between the user and its social networking system connections. The edges in the social graph can have different types that correspond to the different types of actions and connections in the social networking system 100.

The social networking system 100 may maintain or compute a measure of an object's "affinity" for other objects in the social networking system 100. An object may be an individual user, an entity or other content stored by the social networking system 100. The measure of affinity may be expressed as an affinity score representing an object's closeness to another object of the social networking system 100. The affinity score of a user X for an entity Y can be used to predict, for example, if user X would be interested in viewing or likely to view information related to entity Y. The affinity scores can be computed by the social networking system 100 through automated methods, including through predictor functions, machine-learned algorithms, or any other suitable algorithm for determining user affinities. The social networking system 100 may store an archive of historical affinity scores for objects as their affinity scores for various other objects changes over time. Computation of affinity scores is further disclosed in U.S. application Ser. No. 12/978,265, filed on Dec. 23, 2010, which is hereby incorporated by reference in its entirety.

A story unit 180 includes consists of data and/or actions related to users from a particular time period and aggregates data or actions associated with a user for presentation. For example, a story unit may be a story unit that aggregates data and/or actions for presentation on a timeline. In one embodiment, a story unit 180 includes data and/or actions related to a single user, while in other embodiments, a story unit 180 includes data and/or action common to two or more users. A story unit 180 may include a single action or a single item of data or may include multiple actions and/or data that are related in some way. For example, photos and status updates from a single event may be grouped into one story unit 180. In one embodiment, a story unit 180 is presented to users, or "displayed," by generating a displayable representation of the data included in the story unit 180. The displayable representation is then sent to a client device 105, which renders the displayable representation as part of the user interface 130 that can be viewed by a user 135. The user data objects 175, connection objects 195, story units 180 and actions 181 are described in more detail herein.

The social networking system 100 also comprises a user interface manager 115, a display manager 119, a story unit ranker 125, and a story unit generator 120. The user interface manager 115 allows users of the social networking system 100 to interact with the social networking system 100 via the user interface 130 and manages presentation of information to a user. Depending on the type of information being displayed to a user, the user interface 130 may display a timeline generated in association with the display manager 119 or may display any other suitable representation of data associated with social networking system users. In one embodiment, the timeline is a visualization of an individual user's or an entity's social networking system information that is displayed in a navigable chronological sequence. In another embodiment, the timeline is a visualization of multiple entities' common social information displayed in a navigable chronological sequence. For example, a timeline interface displayed on a profile page includes story units based on information related to actions performed with the profile page by the viewing user and by the viewing user's connections.

The story unit generator 120 generates story units 180 from the actions 181 and the user data objects 175. For example, the story unit generator 120 generates story units from actions 181 and user data objects 175. The story unit ranker 125 ranks the story units 180 based on their relevance to and/or preferences of users (the subject users, viewing users, or both). In one embodiment, the story unit ranker 125 uses scores output by machine-learned models to rank the story units 180. The display manager 119 selects story units generated by the story unit generator 120 and sends them, or a displayable representation of them, to the client device 105. At the client device 105 the story units are converted to a displayable representation—if not received in such a form—and are presented. The display manager 119 may use a ranking provided by the story unit ranker 125, user selections, or a combination of both, when selecting story units for presentation.

System Details

Figure 2:
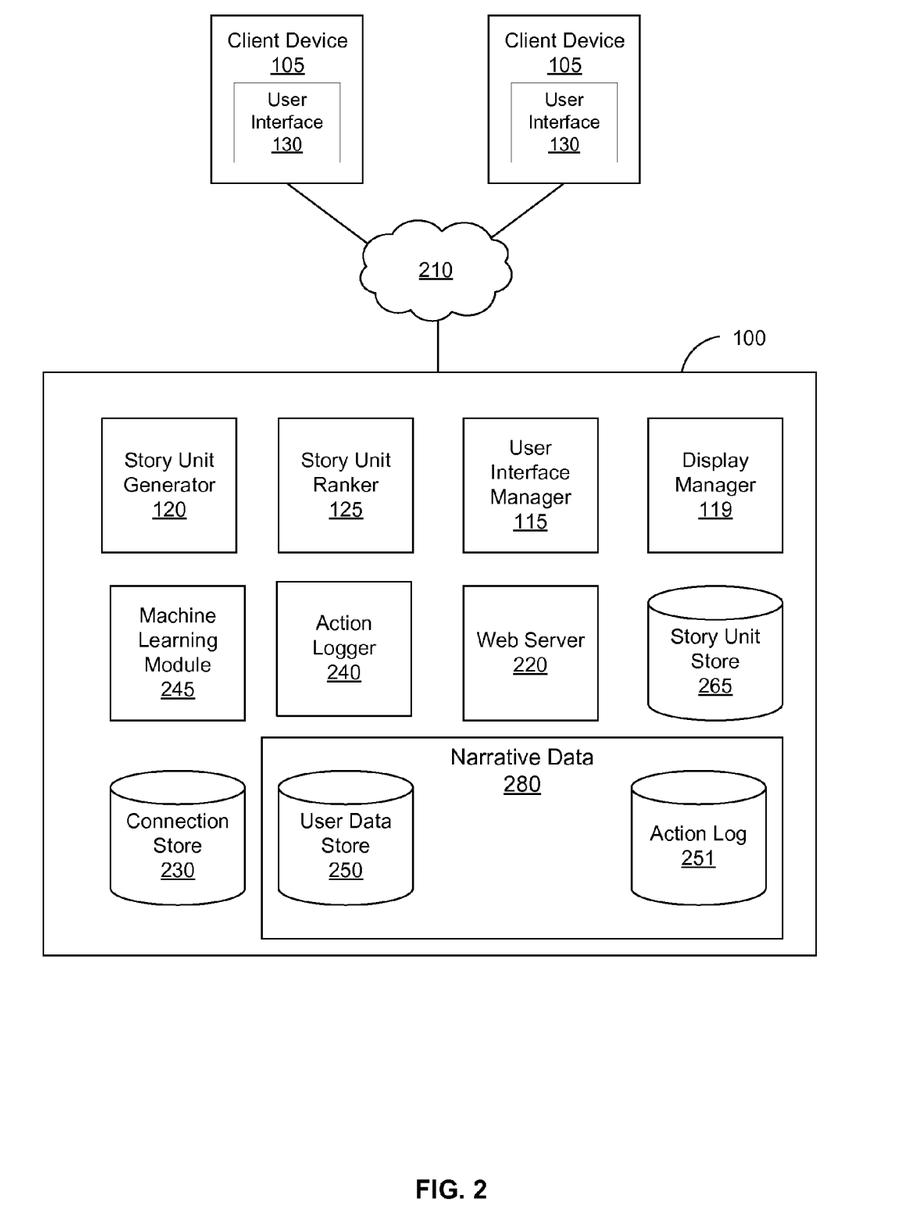
FIG. 2 is a diagram of the system architecture of a social networking system for generating story units that may be visually presented to users, in accordance with an embodiment of the invention.

FIG. 2 is a diagram of the system architecture of a social networking system 100, in accordance with an embodiment of the invention. The social networking system 100 includes a web server 220, a user interface manager 115, a display manager 119, an action logger 240, an action log 251, a data store 250, a connection store 230, a machine-learning module 245, a story unit store 265, a story unit generator 120, and a story unit ranker 125. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 stores data objects 175 in the data store 250. The information captured in the data objects includes descriptive information, and other information relating to individual users and entities of the social networking system 100. For example, data objects associated with an individual user includes information such as age, work experience, educational history, interests, gender, sexual preferences, hobbies or preferences, location, income, languages spoken, ethnic background, etc. Similarly, data objects associated with an entity include various types of information relevant to entities of various types. For example, discography information for musicians, product photos for companies, event information for entities of different types, promotional videos for brands, trailers and cast photos for movies, etc. Information in the data objects may also include information captured by third-party applications that interface with the social networking system 100. Examples of information captured by third-party applications include status updates from social applications, high scores posted from game applications, and music played in media applications.

Information about a user stored as data objects 175 may be explicitly provided by a user or may be inferred from actions and/or other data of the social networking system 100. For example, interests of a user can be inferred from the type of content accessed by the user. As another example, the sentiment of a user comment on profile page may be inferred by analyzing the text content of the comment.

The data store 250 may store other types of data related to users, for example, images, videos, documents, likes, comments, status updates, uniform resource locator (URL) links, etc. Images and video including content related to entities may be tagged with the identification information of the entities. For example, a video of a musician in a band may be tagged with the identifier of both a data object associated with the musician as well as a data object associated with the band. Similarly, an image of a product may be tagged with the identifier for a data object associated with the company that makes the product.

The connection store 230 stores connection data describing connections between different data objects stored in the data store 250. In one embodiment, the connection data is represented as one or more connection objects 195. Connections describe relationships between users and other users, users and objects, or objects and other objects in the social networking system 100. Users specify relationships between users and other objects maintained by the social networking system 100, and connection objects 195 stored by the connection store 230 describe the relationships. For example, connections allow users to establish relationships with other users that parallel real-life relationships between users. Examples of connections describe relationships such as a user being friends with another user, a user being employed by a user, and a user being a family member of another user.

A connection is associated with a connection type identifying the type the type of relationship represented. Examples of connection types include family, friend, colleague, fan, customer, etc. Users may select from predefined types of connections or define their own connection types as needed.

Connections may be added explicitly or inferred by the social networking system 100 based on existing data. Connections in social networking system 100 are usually bi-directional, but may be uni-directional. A connection between users may be a direct connection; however, some embodiments of a social networking system 100 allow the connection to be indirect via one or more levels of connections. For example, the social networking system 100 may infer a connection between individual users that listen to a particular song and an object associated with the band that played the song.

The web server 220 links the social networking system 100 via the network 310 to one or more client devices 105; the web server 220 serves web pages, as well as other web-related content, such as FLASH®, XML, and so forth. The web server 220 receives and routes messages between the social networking system 100 and the client devices 105 as well as other external systems. These messages may be instant messages, queued messages (e.g., email), text and SMS (short message service) messages, or any other suitable messaging technique.

The action logger 240 receives communications from the web server 220 about user actions on and/or off the social networking system 100. The action logger 240 populates the action log 251 with information about user actions, allowing the social networking system 100 to track its users' actions. When a user performs actions using the social networking system 100, action logger 240 adds entries to the action log 251, referred to herein as "actions." Any action taken by users with respect to other users (individual users or entities), is associated with the objects taking the action and the object on which the action was taken by an action 181 stored in the action log 251. Examples of actions include adding a connection to an entity profile page, posting a message to an entity profile page, posting a photo including objects connected with an entity, accepting an invitation to an event hosted by an entity, etc. Some actions may be taken by users while not connected to the social networking system 100, and these actions may be logged by a local application and transmitted to the social networking system 100 when a connection is established.

The data stored in the data store 250 and the actions 181 stored in the action log 251 are collectively called the narrative data 380, which is used for building story units for users and other entities. Narrative data 380 may be associated with a time and a location. In one embodiment, the time and location associated with the narrative data 380 is the time and location when and/or where the social networking system 100 captured the user data or action. In another example, the time and location indicate the creation of a particular piece of user data or the occurrence of a real world event. An item of narrative data 380 may be associated with multiple times and locations. For example, a photograph of a user may be associated with the time and location that photograph was taken as well as the time and location that photograph was uploaded into the social networking system 100. In one embodiment, the narrative data 380 is represented by nodes in a social graph including data (such as image data, text data, video data) and connections that connect the nodes to other nodes, such as those representing individual users and/or entities associated with the narrative data.

The story unit generator 120 generates story units 180 from narrative data 380 that are presented to users of the social networking system 100 by the display manager 119. In one embodiment, the story units 180 are used to generate a timeline interface where the story units are presented in chronological order to a user; however, in other embodiments, the story units 180 are presented to social networking system users in any suitable format. In one embodiment, the story unit generator 120 selects items from the narrative data 380 that are associated with a single subject (e.g., an specific user) to generate story units 180 describing information about the single subject for presentation to one or more social networking system users. In another embodiment, the story unit generator 120 selects items from the narrative data 380 that are associated with multiple subjects and generates story units 180 for presentation in an interface presenting information associated with a multiple subjects. In one embodiment, the story unit generator 120 generates story units 180 prior to receiving a request from the display manager 119. However, the story unit generator 120 may also generate story units 180 responsive to receiving a request from the display manager 119.

In one embodiment, the story units 180 are represented as nodes in a social graph that have connections to other nodes representing narrative data and users. In one implementation, story units 180 are configured for presentation on a timeline interface where the story units 180 are chronologically ordered and presented to users. However, story units 180 may be configured for presentation in any suitable interface, allowing narrative data to be presented to social networking system users in a variety of formats.

A story unit 180 is generated from narrative data 380. In one embodiment, a story unit 180 includes narrative data 380 associated with a specific time period, and may include narrative data from a single time period. For example, different story units 180 include data for different length time ranges, such as days, weeks, months, and years. In other embodiments, a story unit 180 includes narrative data 380 selected based on any suitable criteria.

In one embodiment, a story unit 180 associated with a time period is generated from narrative data 380 over the entire range of that time period. This allows the story unit 180 to simplify access to types or groups of narrative data 380 associated with the time period. For example, a single story unit for the month of January 2010 may be generated from photographs posed by the page administrators of an entity profile page during January 2010; hence, the story unit 180 may be used to access the entity's photos for January 2010.

In another embodiment, a story unit 180 includes a subset of items of narrative data clustering around a single time within the time period. For example, a story unit 180 for January 2010 may be generated for a band's concert in a particular city on a particular day in January 2010; this story unit may include photos, status updates, and public messages received by the band's profile page during the concert. As another example, a story unit 180 may be generated from a single item of narrative data, which may correspond to an event or to data significant to a user. For example, a band releases a new album on Jan. 25, 2010, and a single story unit 180 is generated for this release on that date.

Story units 180 may be sent to a client device 105, either directly or after conversion to a displayable form, where they are used by the client device 105 to display representations of the selected items of narrative data. In one embodiment, the story units 180 are displayed via a timeline interface as part of the user interface 130. The story unit generator 120 may obtain the information describing the selected narrative data from the action log 251 and data store 250, or it may obtain this information directly from other modules, such as the action logger 240, the user interface manager 115, or other modules that implement functionality for performing different types of actions and collecting different types of data.

When converted to a displayable form, the story units 180 may display a transformed representation of and/or a subset of the information in the narrative data 380 from which the story units 180 were generated. For example, when a story unit 180 generated from entity profile page photos in January 2010 is converted to a displayable form, a subset of the photos from that month are included in the displayable form, and the subset of the photos may be displayed in a reduced-size thumbnail format. In another example, a story unit 180 created from a post on a user's profile page is reduced to a short summary with a link to the full post when converted to the displayable form presented on the entity's profile page.

A story unit 180 may include multiple items of narrative data or may include a single item of narrative data 380. In one embodiment, a story unit 180 is associated with a location, allowing displayable representations of the story units to be presented based on their associated location. Alternatively, a story unit 180 is associated with a time interval, allowing the displayable representations of the story units to be presented in a chronological order. In other embodiments, the story unit includes narrative data associated with any suitable characteristic or combination of characteristics to allow ordering of presentation based on the characteristic or combination of characteristics. If the story unit 180 includes a single item of narrative data 380, characteristics, such as a time and a location, associated with the story unit 180 are the same as characteristics of the narrative data 380. If the story unit 180 includes multiple items of narrative data 380, characteristics, such as a time and a location, associated with the story unit 180 are determined based on characteristics of the multiple items of narrative data 380. For example, the story unit 180 is associated with the mean or median of the times of the narrative data 380. As another example, the story unit 180 may be associated with the time of the newest or oldest included narrative data 380. The location of a story unit 180 including multiple items of narrative data 380 may be determined, for example, by taking the geometric center point of the locations of the included narrative data 380. Other characteristics associated with a story unit 180 are determined based on characteristics of the narrative data 380 included in the story unit 180.

Furthermore, the story unit generator 120 may consider privacy settings of individual users to determine whether to present narrative data associated with a subject user to users viewing a story unit 180 (a "viewing user"). A subject user may set its privacy settings to limit the set of users to which certain story units may be shown. For example, a subject user limits presentation of story units 180 including pictures tagged as including the subject user to the subject user's immediate connections. A different subject user may allow presentation of story units 180 including pictures tagged as including the different subject user to any social networking system user. A subject user may also individually block specific viewing users from viewing specific story units 180 on a per-story unit basis or on a per-user basis. Alternatively, a subject user may block user-defined groups of viewing users from viewing certain story units 180. For example, a subject user may define a set of users as "co-workers" and block those users, as a group, from viewing story units 180 including photos of the subject user. Users or groups of users blocked from viewing story units may similarly be given permission to view the story units on a user-by-user basis, a unit-by-unit basis, or a group basis.

In an embodiment, the story units 180 are stored in the story unit store 265. The story units 180 in the story unit store 265 may be represented as database entries that link various objects related to the story units 180. Each story unit 180 stored in the story unit store 265 may be associated with other objects in the social networking system 100. For example, a story unit 180 may be associated with one or more individual users or other objects that performed an action described in the story unit 180. Individual users or other objects performing an action described in a story unit 180 are called the "actors" for that story unit 180. For example, if a story unit 180 describes a comment posted by John on a video posted on a band's profile page, both John and the band are considered actors of the story unit. As another example, a story unit 180 describing a comment posted by a user to an entity's profile page may identify both the user who posted the comment and the entity associated with the profile page as actors.

In an embodiment, the story unit generator 120 generates story units 180 that may be visually displayed without additional processing. In another embodiment, the story unit generator 120 generates story units 180 that are combined with visual templates provided by the user interface manager 115 to create displayable representations of the story units 180, which sent to a client device 105 for display via a user interface 130. In yet another embodiment, visual templates provided by the user interface manager 115 and the story units 180 are sent to the client 105, which combines the visual templates and the story units 180 to create a displayable representation of the story unit 180 for display.

Stories and Newsfeeds

As described above in conjunction with FIG. 2, story units, also referred to as "stories," are an aggregation of data gathered by the social networking system 100 that may be configured for presentation to a user through a specific type of interface, or "view." For example, timeline units are a type of story unit including data configured for presentation in a timeline view where timeline units are presented in an order determined by temporal data associated with the timeline units. However, stories may be presented in any suitable view, such as a real-time newsfeed, a timeline interface, a map interface where the stories are displayed based on associated location data, or in any other suitable interface.

In one embodiment, the social networking system 100 includes different types of story unit generators 120 configured to generate stories for presentation in different types of interfaces. A story generator 120 selects narrative data 280 and generates story units based on templates associated with the story generator 120 to configure the presentation and behavior of the generated story units. In some embodiments, story generators 120 are each configured to generate story units for presentation through a particular view and may restrict selection of narrative data 280 to that suitable for generating story units for presentation through an interface associated with a story generator 120. For example, a story generator 120 is configured to generate stories for a map view of "check-ins," so the story generator 120 limits selection of narrative data 280 to data having the type "location check-ins." In another example, a story generator 120 is configured to generate stories for a photo album view, so the story generator limits 120 selection of narrative data 280 to data including or referencing images. Similarly, a story generator 120 may be configured to generate stories for presentation through a timeline view and selects narrative data 280 suitable for generating timeline units to present via the timeline view.

Generation of story units for newsfeed views and historical newsfeed views is another example of story generation. A newsfeed is a scrollable list of story units relevant to a user viewing the newsfeed (a "viewing user") that is updated in real-time. A historical newsfeed is a newsfeed from a prior time period that includes story units associated with the prior time period rather than associated with a current time interval. In one embodiment, story units for a newsfeed or for a historical newsfeed are displayed together in a scrollable list. Multiple story generators 120 may produce different types of story units for presentation in newsfeeds and historical newsfeeds. Generating stories for a newsfeed from data captured by a social networking system are disclosed in U.S. application Ser. No. 11/503,037, filed on Aug. 11, 2006, and U.S. application Ser. No. 11/502,757, filed on Aug. 11, 2006, which are hereby incorporated by reference in their entirety.

Story Unit Generation and Ranking

Figure 3:
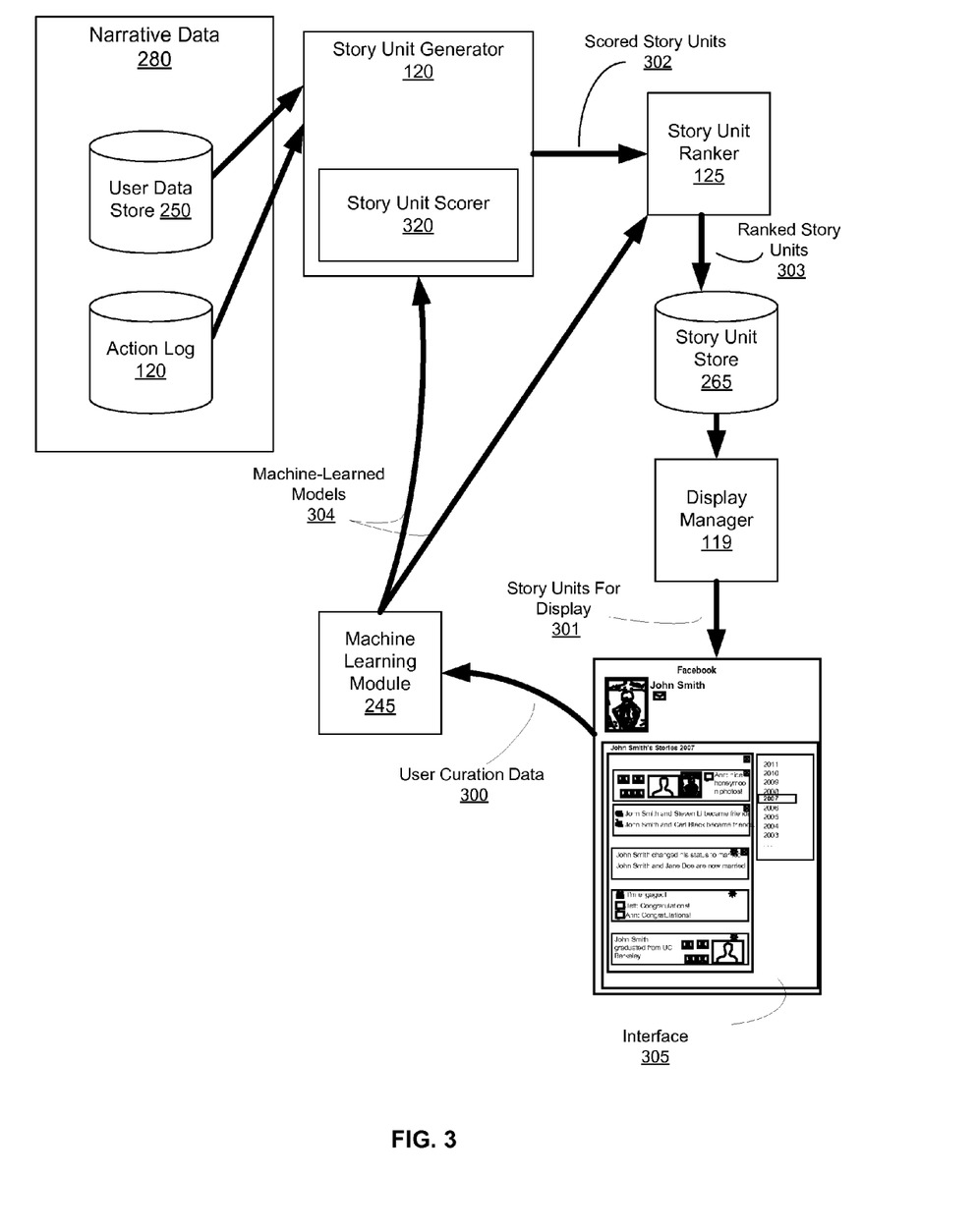
FIG. 3 is a data flow diagram illustrating interactions between various modules of the social networking system for generating and ranking story units, in accordance with an embodiment of the invention.

FIG. 3 is a data flow diagram of generating and ranking story units in a social networking system 100. In the embodiment shown by FIG. 3, the story unit generator 120 retrieves narrative data 280 to generate story units 180 for presentation in an interface 305 (e.g., a timeline interface, a newsfeed, a map interface, etc.). Each story unit 180 includes information about the narrative data 280 represented by a story unit 180 and may also include a score generates by a story unit scorer 420. In one embodiment, the story unit generator 120 generates a number of story units based on characteristics of the interface 305, such as available display area. In another embodiment, the story unit generator 120 generates a greater number of story units 180 than the display area of the interface 305 is capable of presenting at one time, so additional story units 180 are readily available if a downstream process—such as a privacy process—hides one or more story units 180 from presentation via the interface 305.

The story generator 180 may select narrative data items based on social networking data such as a number of users expressing a preference for an item, a number of comments on the item, views of the item, affinity of viewing user for the item, etc. Additionally, selection of narrative data 280 may also account for a time when the story units 180 are generated. For example, narrative data items within a threshold time interval of a time when the story units 180 are generated are selected. Selection of narrative data 280 may also account for preferences of a user viewing the interface 305 as well as privacy settings associated with users associated with various items of narrative data 280.

In an embodiment, the story unit generator 120 uses machine-learned models generated by the machine learning module 245 to select narrative data 280. In another embodiment, the story unit generator 120 selects narrative data 280 using a rule-based system based on manually specified rules. In yet another embodiment, the story unit generator 120 selects narrative data 280 for generating story units 180 based on feedback (such as through curation) from viewing users or from users associated with narrative data 280 in story units. The story unit generator 120 may also use any combination of the above mentioned techniques to select narrative data for generating story units 180.

In one embodiment, the story unit generator 120 generates story units 180 associated with a single user by selecting narrative data 280 related to the single user. For example, photos associated with a single user, posts about the single user, events associated with the single user or other narrative data associated with the single user. Story units 180 generated from the selected narrative data 180 are used to generate an interface 305 for the user, such as a profile page or a timeline for the single user.

In another embodiment, the story unit generator 120 generates shared story units 180 associated with a subject user as well as a viewing user or other users connected to the viewing user. To generate shared story units 180, the story unit generator 120 selects narrative data 280 related to both the subject user and one or more of the viewing user and users connected to the viewing user. These shared story units 180 may be displayed in the friend activity section of a profile page, in a newsfeed, or in any other suitable interface 305. For example, if the subject user is a band, story units 180 including photos of users connected to a viewing user that are at the band's concerts, songs of the band played by the users connected to the viewing user or other suitable data are generated. The shared story units 180 may be used to generate a common timeline, news feed, friend activity panel, or other interface 305 including narrative data 180 of the subject entity that is related to the viewing user or to users connected to the viewing user. Examples of displaying an intersection between entities of a social networking system are disclosed in U.S. application Ser. No. 13/087,672, filed on Apr. 15, 2011, which is hereby incorporated by reference in its entirety.

The generated story units 180 may have different types based on their included content and/or their informational purpose. In one embodiment, some story units 180 are configured to display information describing a particular event. Other story units 180 may describe job changes, concerts, trips, weddings, birthdays, film viewings, or other information. Some story units 180 may be configured to display aggregate groups including data having various types. For example, there may be story unit types for aggregating photos, videos, or music from a particular time period or event (e.g., a photo report for a concert event). Other story units 180 may describe actions performed on with social networking system users.

Different story unit types arrange data in a manner that is informative to the viewing user. Because story units 180 are configured to give a summary of the narrative data 280 from which they are generated, a story unit representation may display a subset of the narrative data 280 used to generate the story unit 180. A visual representation of a story unit 180 may display information summary elements presenting users with a compact and informative summary of narrative data 280. Examples of information summary elements include image thumbnails (which act as image summaries), text extracts (which act as textual comment summaries), frame captures and GIF animations (which act as video summaries), statistical summaries (numbers that provide information on the narrative data), etc. Information summary elements may be generated from narrative data 280 most relevant to a viewing user to provide the viewing user with the most compelling summaries. For example, a story unit 180 is generated for a photo album that includes information summary elements displaying thumbnails of the three most popular photos in photo album and number indicating the number of photos in the album.

Information summary elements may be updated dynamically as the underlying narrative data 280 changes. The visual representations of the story units 180 may also include navigation aids allowing users to conveniently obtain more information about specific narrative data 280. Examples of navigation aids include web links, tabs, and buttons. An element in a visual representation of a story unit 180 may be both an information summary element and a navigation aid. For example, the visual representation of a story unit 180 includes a set of photo thumbnails representing images from a subject user's photo album, where each thumbnail is also a link that may be accessed to navigate to the photo album itself and to view other photos in the album.

The story unit scorer 320 produces a score for each generated story unit 180 corresponding to the importance of a story unit 180 to a user associated with narrative data 280 included in the story unit 180 (a "subject user") and/or to a viewing user. The importance of a story unit 180 to a subject user may be determined by the preferences and curation of narrative specified by the subject user. In one embodiment, the story unit scorer 320 uses machine-learned models produced by the machine learning module 245 to produce the score for each generated story unit 180. The machine-learned models evaluate story units 180 against other story units 180 having a similar type. For example, story units 180 including photos are compared against other timeline units 180 including photos, rather than against story units 180 including links and/or text. To evaluate the relevance of story units 180 to a viewing user, the machine-learned models may use various features of the narrative data 180 represented in the story units 180. Examples of features for evaluating the relevance of story units 180 include social data signals such as user indications of a preference for a story unit 180, user comments associated with a story unit 180, user tags associated with a story unit 180, user views of a story unit 180, user affinity for a user or object associated with a story unit 180, or any other suitable information. Additional features for evaluating the relevance of story unit 180 include image features, video features, textual features, or other information describing the content of the story unit 180.

The scored timeline units 302 output by the timeline unit generator 120 are processed by the story unit ranker 125 to produce a ranking of story units 180. To produce a unified ranking including different types of story units 180, the story unit ranker 125 normalizes scores across different story unit types. The normalization process may weight certain types of story units 180 to increase or decrease their rank. For example, the social networking system 100 may give additional weight to story units 180 including photos while reducing the weight of story units 180 that predominantly include text because viewers often prefer photos over text. The weightings and the details of the normalization process may be adjusted based on the needs of the social networking system 100. For example, the normalization process may be configured for a particular user (e.g., a specific entity) or a specific demographic to account for tastes and preferences.

In one embodiment, the story unit ranker 125 uses machine-learned models produced by the machine learning module 245 to determine the appropriate weighting for each story unit type. To weight each type of story unit 180, machine-learned models may analyze various features and social data signals associated with these story unit types. Examples of features and signals include user indications of preference, user comments, user views, user affinity, or other user interactions with story units 180. Features of narrative data 280 included in story units 180 may also be factors in determining weights for types of story units 180. The story unit ranker 125 creates a ranking based on the normalized scores. The ranked story units 303 may be stored in the story unit store 265, or may be selected by the display manager 119 for presentation to a user via an interface 305.

In one embodiment, the story unit ranker 125 removes duplicate narrative data 280 appearing in story timeline units (de-duplication) from the ranked timeline units 403. For example, if the story unit ranker 125 identifies two story units 180 including the same narrative data 280, the story unit ranker 125 removes the story unit 180 with the lower score from the ranking. This prevents the same narrative content 280 from being presented in multiple story units 180.

As another example, if the story unit ranker 125 detects two story units including the same narrative data 280, the timeline unit ranker 125 removes the duplicated narrative data from the story unit 180 with the lower score. Removing duplicated narrative data 280 may cause the story unit ranker 125 to further analyze the story unit 180 from which the duplicated narrative data is removed to determine if removing the duplicated narrative data renders the story unit 180 "uninteresting" or invalid. For example, if a story unit 180 includes a single photo and a comment about the photo, removing the comment may not make the story unit 180 uninteresting, as users are likely to view photos without comments. However, removing the photo may render the story unit 180 uninteresting as a comment about a photo is unlikely to be interesting without the photo itself.

In one embodiment, the story unit ranker 125 implements a diversification process to ensure inclusion of various types of story units 180 in the interface 305. A diversification process prevents an interface 180 from including greater than at threshold number of story units 180 having a particular type. For example, without a diversification process, it is possible that the highest-ranked story units 180 are predominantly photo story units 180, creating an interface 305 displaying predominantly photos. Accordingly, the story unit ranker 125 may use a variety of methods to diversify the types of story units 180 selected by the display manager 119. One method selects a specified number of each type of story unit 180 for display. Another method negatively weights story units 180 of a type when a specified number of story units 180 of the same type have been selected for display. In one embodiment, the diversification process may be performed when the story units 180 are ranked and stored in the story unit store 265. Diversification may also be varied based on the demographic of the viewing user, the subject user, or both.

In one embodiment, the display manager 119 allows viewing users to select particular interfaces 305, or "views," that are biased to show a particular type of story unit 180 or to display an increased number of story units 180 having a specific type. The display manager 119 provides various "views" by weighting the score of a particular type of story unit 180 to increase the likelihood of story units 180 having the particular type being selected for presentation. For example, if a user selects a "Photos" view, the display manager 119 increases the scores of story units 180 including photos relative to other types of story units 180, so the story units for display 301 are story units 180 including photos.

Machine Learning Module

The machine learning module 245 generates one or more machine-learned models 304 used by the story unit scorer 320, the story unit generator 120, and the story unit ranker 125. Additional components of the social networking system 100 may also use the one or more machine-learned models 304. For example, the machine-learned models 304 may be used by the display manager 119 to determine photos displayed in a "Photo" view. Examples of machine-learned models 304 include tree-based models, kernel methods, neural networks, splines, and combinations of one or more of these techniques. The machine learning module 245 may also use other machine-learned methods or statistical methods to generate models.

In one embodiment, the machine learning module 245 uses curation data 300 received via an interface 305 to improve the one or more machine-learned models 304. The curation data 300 may include explicit preference data as well as implicitly collected social data. Examples of explicit preference data include data about which story 180 units have been hidden, muted, deleted, starred, liked or promoted by page administrators. Examples of implicitly collected social data include information about which story units 180 have been viewed, expanded, linked, commented, shared, etc. The curation data 300 may be used as training data to improve machine-learned models by the machine learning module 245 used by other components. For example, the timeline unit ranker 125 uses a trained machine-learned model 304 from the machine learning module 245 to weight various types of story units 180 during the score normalization process. Another trained machine-learned model 304 may be used by the story unit scorer 320 to generate story unit scores. Yet another trained machine-learned model 304 may be used by the story unit generator 120 to select narrative data for generating story units 180.

The machine learning module 245 may generate a single set of machine-learned models 304 capturing the preferences of the entire user base of the social networking system 100. Alternatively, the machine learning module 245 generates separate sets of machine-learned models 304 for subsets of the user base of the social networking system 100 (e.g., a different set of models for users in different age ranges). The machine learning module 245 may also generate a distinct set of machine-learned models capturing preferences of individual social networking system users.

Figure 4:
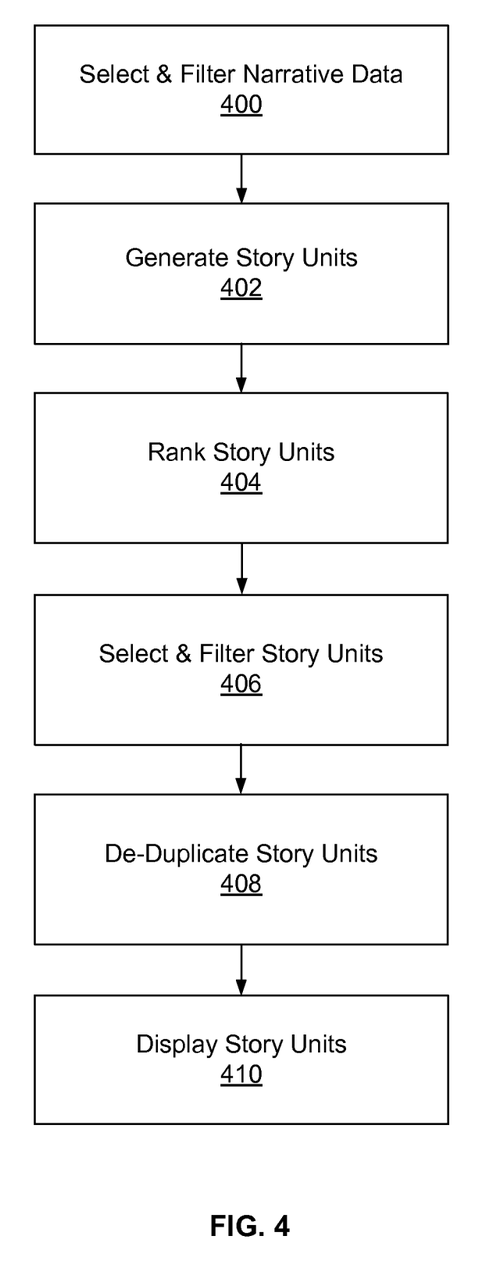
FIG. 4 illustrates one embodiment of selection of story units for presentation to social networking system, in accordance with an embodiment of the invention.

FIG. 4 illustrates one embodiment of a method for generating, selecting, and presenting story units, or "stories," to a social networking system user. One or more story generators 120 select and filter 400 narrative data 280 to generate story units. For example, if the story units are presented via a newsfeed view, narrative data 280 is selected based on the viewing user for which the newsfeed is being generated. In one embodiment, the one or more story generators 120 select all narrative data associated with the viewing user and with other users directly connected to the viewing user (e.g., friends, relatives, co-workers, etc.). In another embodiment the story generators 120 apply one or more filters to narrative data 280 to select narrative data 280 satisfying particular criteria. For example, a filter may be used to limit selection of narrative data to data for which the viewing user has the highest affinity scores.

A ranking process may also be used to select relevant narrative data 280. In another example, a filter may be used to remove narrative data that the viewing user has previously viewed, limiting story generation to using unviewed narrative data. Similarly, the newsfeed may use a filter to select narrative data 280 captured within a specified time interval (e.g., narrative data captured in the last day, or week), to select narrative data 280 associated with a specific user, to select narrative data 280 within a threshold distance of a specified location, to select narrative data 280 associated with a particular user and users connected to the particular user, or to select narrative data 280 having any suitable characteristic. For example, filtering narrative data 280 to identify narrative data associated with a subject user or associated with users connected to the viewing user allows generation of stories for inclusion in a friend activity interface on a profile page.

A story generator 120 may also filter narrative data based on its type. For example, an event story generator 120 selects narrative data 280 associated with one or more events, while a photo story generator 120 selects narrative data 280 including images. In one embodiment, story generators 120 filter selection of narrative data 280 based on privacy settings of the subject entities associated with narrative data 280. For example, if a user associated with narrative data 280 specifies a privacy setting presenting a specific viewing user from accessing the narrative data 280, one or more story generators 120 do not consider the narrative data 280 when generating stories for the specific viewing user. In other embodiments, privacy settings are applied later in story generation the process as described herein.

Selecting and filtering 400 narrative data 200 for generating stories for a historical newsfeed is similar to selecting and filtering narrative data for generating stories for a newsfeed. However, a story generator 120 for a historical newsfeed may filter narrative data 280 based on the viewing user's current affinity scores for narrative data 280 or the viewing user's historical affinity scores for narrative data 280 from the time period for which the historical newsfeed is being generated. In addition, narrative data 280 is filtered to select data associated with the time period for which the historical newsfeed is being generated.

The story generators apply templates to the selected narrative data 280 to generate 402 candidate stories. The templates include information describing presentation of the narrative data 280 for display in the stories. Templates may define a particular layout or arrangement of data and may also define particular user interfaces or behaviors for the stories, based on the purpose of the stories. Hence, narrative data 280 may be arranged in different ways for different user interfaces, or "views," using different types of story units. The candidate stories may be stored in a database for rapid retrieval. In one embodiment, a story is stored in a database as a list of references to narrative data 280 along with additional information referred to as "story metadata." The presentation and behavior of the story when displayed on a client device 105 is defined by the story metadata.

Each candidate story is associated with a unique hash or identifier. The hash or identifier may be generated based on the type of story generator that created a candidate story and the story metadata associated with the candidate story. Associating a unique hash or identifier with candidate stories allows the social networking system 100 to easily track the stories with which a viewing user interacted. Tracking the viewing user's interaction with stories improves selection of stories for the viewing user by adjusting the viewing user's affinity scores for the narrative data 280 in the stories with which the user interacted. In some embodiments, a story may be regenerated as new narrative data 280 is captured by the social networking system 100, allowing the story to be updated to include the newly captured narrative data. Because a story's hash value is based on the story generator type and the story generator, a regenerated story retains its original hash value even though its narrative data 280 is modified. This enables the social networking system 100 to tracking stories even as their narrative data changes.

The candidate stories are ranked 404 to determine their relative relevance to the viewing user. Ranking 404 of candidate stories may be based on the viewing user's affinity scores for the stories or affinity scores for the narrative data that the stories reference. The ranking 404 may also account for the viewing user's interaction history with the stories or may modify the affinity scores for narrative data associated with stories with which the viewing user interacted. One or more machine-learned models, as described above in conjunction with FIG. 3, may be used to rank 404 the candidate stories. If a historical newsfeed is generated, candidate stories may be ranked 404 based on the viewing user's current affinity scores or based on the viewing user's historical affinity scores from the time period for which the historical newsfeed is being generated.

Based on the ranking, stories having at least a threshold position in the ranking or having at least a threshold affinity score ("top stories") are selected and filtered 406. The social networking system 100 may enforce various policies by removing candidate stories that do not meet certain criteria. For example, privacy settings of subject users associated with the narrative data 280 referenced in the stories are applied and used to filter candidate stories. In this example, stories including narrative data 280 that a viewing user is not authorized to view are removed from the selected top stories.

Filtering may also be used to diversify the stories in the newsfeed and historical newsfeed. Diversification of stories results in selection and subsequent presentation of different types of stories. As an example, diversification specifies a threshold number of stories having various types, so that a user is presented with multiple types of stories. For example, the ranking of stories having story types with less than a threshold number of stories having at least a threshold position in the ranking is increased while the ranking of stories having story types with greater than a maximum number of stories having at least a threshold position in the ranking is reduced. Alternatively, stories may be diversified when retrieved for ranking or for selection. For example, selection of story units 180 form the story unit store 265 is monitored to identify types of story units 180 previously selected, and based on previously selected types of story units 180, story units of different types are selected from the story unit store 265.

In one embodiment, the selected stories are de-duplicated 408 to remove duplicate narrative data 280. For example, de-duplication removes a lower-ranked story having narrative data 280 duplicative of narrative data 280 included in a higher-ranked story. As another example, duplicate narrative data 280 is removed from a story, while the story itself is maintained. In one embodiment, a story is re-scored after removal of duplicate narrative data 280.

After de-duplication, the selected top stories are sent to the viewing user's client device 105 for display 410 in a view, such as a timeline, a newsfeed, or a historical newsfeed. In one embodiment, a visual representation of the story is sent rather than the story. The visual representation may be generated by accessing narrative data 280 referenced by a story and configuring a visual representation of the narrative data using the story metadata.

The newsfeeds and historical newsfeeds may have variations differing from the embodiment described above. While the above-described embodiment refers to newsfeeds and historical newsfeeds using narrative data 280 associated with the viewing user or any user connected to the viewing user, in other embodiments the selected narrative data 280 is associated with a single subject user, which may also be the viewing user. In this embodiment, the affinity scores of the subject user, instead of the viewing user, may be used to determine the relevance of the narrative data and/or stories. In another variation, stories generated for a newsfeed or historical newsfeed may be presented as part of a "map view," which plots stories on a map based on location.

SUMMARY

In some embodiments, the modules of the social networking system 100 are not contained within a single networking system but are found across several such systems. The social networking system 100 may communicate with the other systems, for example, using APIs. In these embodiments, some modules shown in FIG. 2 may run in the social networking system 100, whereas other modules may run in the other systems. For example, in one embodiment the user data store 250 and action log 251, may run on some external networked database system outside the social networking system 100.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    logging actions taken by users of a social networking system;
    determining one or more story generators based on a view requested by a client device of a viewing user of the social networking system;
    accessing a plurality of logged actions of the viewing user or one or more other users connected to the viewing user in the social networking system;
    selecting one or more of the logged actions based on a relevance of each of the logged actions to the viewing user;
    generating a plurality of candidate stories from the logged actions using the one or more story generators, each of the plurality of candidate stories being associated with a story type of a plurality of story types, where two or more candidate stories of the plurality of candidate stories are associated with a same logged action;
    generating an affinity for each of the plurality of candidate stories, wherein each affinity comprises a measure of the relevance of a candidate story of the plurality of candidate stories to the viewing user;
    generating a ranking of the plurality of candidate stories based on the affinity generated for each the plurality of stories;
    identifying the two or more candidate stories that are associated with the same logged action;
    responsive to the identifying, updating the ranking by removing a subset of the two or more candidate stories from the ranking;
    selecting one or more of the plurality of candidate stories as selected stories for the view requested by the client device of the viewing user based on the updated ranking; and
    sending the requested view comprising displayable representations of the selected stories to the client device for display to the viewing user.

2. The method of claim 1, wherein selecting the one or more of the plurality of candidate stories based on the updated ranking comprises:
    removing one or more logged actions included in a story.

3. The method of claim 1, wherein updating the ranking further comprises:
    removing candidate stories associated with logged actions previously viewed by the viewing user.

4. The method of claim 1, wherein updating the ranking further comprises:
    removing candidate stories associated with logged actions that the viewing user does not have permission to view.

5. The method of claim 1, wherein updating the ranking further comprises:
    removing candidate stories associated with logged actions having one or more types not associated with the requested view.

6. The method of claim 1, wherein each candidate story comprises story metadata and one or more references to one or more logged actions, the story metadata comprising information describing visual presentation of a displayable representation of a candidate story.

7. The method of claim 1, wherein selecting one or more of the plurality of candidate stories based on the ranking comprises:
    modifying the ranking by increasing a position in the ranking of a candidate story having a story type associated with less than a threshold number of stories having at least a threshold position in the ranking;
    selecting one or more of the candidate stories based on the modified ranking.

8. The method of claim 1, wherein selecting one or more of the plurality of candidate stories based on the ranking comprises:
    modifying the ranking by decreasing a position in the ranking of a candidate story having a story type associated with at least a threshold number of stories having at least a threshold position in the ranking;
    selecting one or more of the candidate stories based on the modified ranking.

9. A method comprising:
    accessing a plurality of logged actions related to a viewing user of a social networking system, the plurality of logged actions comprising logged actions of the viewing user or one or more other users connected to the viewing user in the social networking system;
    selecting one or more of the logged actions from the plurality of logged actions based at least in part on a relevance of each of the logged actions to the viewing user;
    generating a plurality of candidate stories from the logged actions based on a view requested by the viewing user, each of the plurality of candidate stories being associated with a story type of plurality of story types, two or more stories of the plurality of candidate stories associated with a same logged action;
    selecting one or more of the generated candidate stories based on the viewing user;
    identifying the two or more candidate stories associated with the same logged action;
    responsive to the identifying, removing a subset of the two or more candidate stories from the plurality of candidate stories; and
    sending displayable representations of the candidate stories to a client device for display to the viewing user.

10. The method of claim 9, wherein selecting logged actions from the plurality of logged actions based at least in part on the relevance of each of the logged actions to the viewing user comprises:
- determining a type of logged action associated with the requested view;
- identifying logged actions having the type of logged action associated with the requested view; and
- selecting the logged actions from the identified logged actions based at least in part on the relevance of the identified logged actions to the viewing user.

11. A method comprising:
- accessing a plurality of logged actions related to a subject user of a social networking system, the plurality of logged actions comprising logged actions of the viewing user or one or more other users connected to the viewing user in the social networking system;
- determining one or more story generators based on a view requested by a client device of a viewing user of a social networking system;
- selecting one or more of the logged actions of the plurality of logged actions based on a relevance of each of the logged actions to the subject user;
- generating a plurality of candidate stories from the selected logged actions using the one or more story generators, each of the plurality of candidate stories being associated with a story type of plurality of story types, two or more candidate stories of the plurality of candidate stories associated with a same logged action;
- generating an affinity for each of the plurality of candidate stories, wherein each affinity comprises a measure of the relevance of a candidate story of the plurality of candidate stories to the subject user;
- generating a ranking of the plurality of candidate stories based on the affinity generated for each the plurality of candidate stories;
- identifying the two or more candidate stories associated with the same logged action;
- responsive to the identifying, removing a subset of the two or more candidate stories from the plurality of stories;
- selecting one or more of the plurality of candidate stories as selected stories for the view requested by the client device of the viewing user based on the updated ranking; and
- sending the requested view comprising displayable representations of the selected one or more of the ranked stories to a client device for display to the viewing user.

12. The method of claim 11, wherein selecting the one or more of the plurality of candidate stories based at least in part on the updated ranking comprises:
- removing one or more logged actions included in a candidate story from an candidate story.

13. The method of claim 11, wherein updating the ranking further comprises:
- removing candidate stories associated with logged actions previously viewed by the viewing user.

14. The method of claim 11, wherein updating the ranking further comprises:
- removing candidate stories associated with logged actions that the viewing user does not have permission to view.

15. The method of claim 11, wherein updating the ranking further comprises:
- removing candidate stories associated with logged actions having one or more types not associated with the requested view.

16. The method of claim 11, wherein selecting one or more of the plurality of candidate stories based at least in part on the ranking comprises:
- modifying the ranking by increasing a position in the ranking of a candidate story having a story type associated with less than a threshold number of stories having at least a threshold position in the ranking;
- selecting one or more of the candidate stories based on the modified ranking.

17. The method of claim 11, wherein selecting one or more of the plurality of candidate stories based at least in part on the ranking comprises:
- modifying the ranking by decreasing a position in the ranking of a candidate story having a story type associated with at least a threshold number of stories having at least a threshold position in the ranking;
- selecting one or more of the candidate stories based on the modified ranking.

* * * * *

UNITED STATES PATENT AND TRADEMARK OFFICE
CERTIFICATE OF CORRECTION

PATENT NO. : 9,609,073 B2  
APPLICATION NO. : 13/928744  
DATED : March 28, 2017  
INVENTOR(S) : Raylene Kay Yung et al.

Page 1 of 1

It is certified that error appears in the above-identified patent and that said Letters Patent is hereby corrected as shown below:

In the Claims

Column 19, Line 54, Claim 1, after "each" insert -- of --.

Column 20, Line 1, Claim 2, after "selecting" delete "the".

Column 20, Line 23, Claim 6, delete "a" insert -- the --.

Column 20, Line 40, Claim 8, after "ranking;" insert -- ranking; and --.

Column 21, Line 37, Claim 11, after "each" insert -- of --.

Column 22, Line 7, Claim 11, after "to" delete "a" insert -- the --.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*